(12) United States Patent
Bertrand et al.

(10) Patent No.: US 9,797,786 B2
(45) Date of Patent: Oct. 24, 2017

(54) DEVICE FOR CALIBRATING TEMPERATURE, AND METHODS FOR CALIBRATING THE TEMPERATURE OF AND POSITIONING A FIBER-OPTIC TEMPERATURE SENSOR

(75) Inventors: Johan Bertrand, Ile de France (FR); Jean-Philippe Dubois, Ile de France (FR); Ronan Morice, Ivebres (FR); Patrick Sollet, Mainvilliers (FR); Alain Lesauvage, Elancourt (FR)

(73) Assignees: AGENCE NATIONALE POUR LA GESTION DES DECHETS RADIOACTIFS, Chatenay-Malabry (FR); LABORATOIRE NATIONAL DE METROLOGIE ET D'ESSAIS, Paris (FR)

( * ) Notice: Subject to any disclaimer, the term of this patent is extended or adjusted under 35 U.S.C. 154(b) by 899 days.

(21) Appl. No.: 14/238,258

(22) PCT Filed: Sep. 6, 2012

(86) PCT No.: PCT/EP2012/067410
§ 371 (c)(1),
(2), (4) Date: May 7, 2014

(87) PCT Pub. No.: WO2013/034640
PCT Pub. Date: Mar. 14, 2013

(65) Prior Publication Data
US 2014/0241393 A1 Aug. 28, 2014

(30) Foreign Application Priority Data
Sep. 9, 2011 (FR) ...................... 11 58032

(51) Int. Cl.
*G01K 15/00* (2006.01)
*G01K 11/32* (2006.01)

(52) U.S. Cl.
CPC ............ *G01K 15/005* (2013.01); *G01K 11/32* (2013.01); *G01K 15/00* (2013.01); *G01K 15/002* (2013.01)

(58) Field of Classification Search
CPC .................................................... G01K 15/002
See application file for complete search history.

(56) References Cited

U.S. PATENT DOCUMENTS 5,825,804 A 10/1998 Sai
6,641,299 B2 * 11/2003 Sasajima ............. G01K 15/002
250/495.1
(Continued)

FOREIGN PATENT DOCUMENTS

CN 1820190 A 6/2006
CN 101387562 3/2009
(Continued)

OTHER PUBLICATIONS

"The International Temperature Scale of 1990", Metrologia 27, 107 (1990).*
(Continued)

*Primary Examiner* — Minh Phan
*Assistant Examiner* — Leon W Rhodes, Jr.
(74) *Attorney, Agent, or Firm* — Pearne & Gordon LLP (57) ABSTRACT

The invention relates to a device (100) for calibrating the temperature of a fiber-optic temperature sensor, with which an optical fiber (10) of a fiber-optic temperature sensor is to be provided. The device (100) comprises a device body (101) having a passage (109) through which the optical fiber (10) is to pass, and a means for transferring heat energy. The device (100) further comprises at least one portion (160*a*), referred to as a first fixed point, which is made from a first material having at least a first predefined temperature at which the state thereof changes. The first fixed point (160*a*)
(Continued)

is thermally connected to the optical fiber (10) when the optical fiber (10) is provided with the device (100). The heat-transferring means is arranged in the device body (101) such that, during the actuation thereof, the heat-transferring means exchanges heat energy with the first fixed point (160*a*) so as to cause a change in the state thereof at the first predefined temperature.

12 Claims, 4 Drawing Sheets

(56) References Cited

U.S. PATENT DOCUMENTS

| | | | |
|---|---|---|---|
| 7,398,697 B2 * | 7/2008 | Allen | E21B 17/01 |
| | | | 73/800 |
| 7,529,434 B2 | 5/2009 | Taverner et al. | |
| 8,740,455 B2 * | 6/2014 | Hall | G01K 13/10 |
| | | | 340/853.1 |
| 2006/0115205 A1 | 6/2006 | Cuypers | |
| 2008/0317088 A1 | 12/2008 | Yamada | |
| 2011/0231135 A1 | 9/2011 | Suh et al. | |

FOREIGN PATENT DOCUMENTS

| | | | | |
|---|---|---|---|---|
| CN | 101813532 A | | 8/2010 | |
| GB | 2 181 830 A | | 4/1987 | |
| GB | 2 210 451 A | | 6/1989 | |
| GB | 2215839 A | * | 9/1989 | ............. G01K 15/00 |
| GB | 2407637 | | 5/2005 | |
| JP | 07234166 A | * | 9/1995 | |
| JP | 2001-201406 A | | 7/2001 | |
| JP | 2007-108048 A | | 4/2007 | |
| WO | WO2010036360 | | 4/2010 | |

OTHER PUBLICATIONS

International Search Report issued in Application No. PCT/EP2012/067410 dated Dec. 4, 2012.
Written Opinion issued in Application No. PCT/EP2012/067410.

* cited by examiner

DEVICE FOR CALIBRATING TEMPERATURE, AND METHODS FOR CALIBRATING THE TEMPERATURE OF AND POSITIONING A FIBER-OPTIC TEMPERATURE SENSOR

TECHNICAL FIELD

The invention relates to the field of fiber-optic temperature measurement and the methods used for calibrating temperature and distance during such measurements.

The observation and monitoring of civil engineering structures requires good knowledge of an important parameter which is the temperature and differences thereof, this with the aim:
1. of analyzing the behavior of structures uncorrelated with environmental heat fluctuations;
2. and detecting anachronous events such as hot points or leaks of fluid in major hydraulic structures, such as dykes, hydroelectric dams, or utilitarian structures, such as waste storage and confinement buildings, freeways or certain tunnels.

These structures thus require temperature measurement monitoring methods that are adapted, reliable from a metrological viewpoint, proven during the putting in place of an alarm and distance resolved, so as to carry out automatic measurements at regular intervals over the whole of the structure.

Such a method is also necessary for the monitoring of energy recovery or distribution installations of the type: drill pipes, pipelines, forced current water pipes, district heating supply pipes and energy recovery systems for geothermal energy.

Due to the distances that need to be covered, which can exceed several tens of kilometers, and the inaccessibility of certain of these zones to be monitored, it is known to use temperature measurement methods implementing fiber-optic temperature sensors. In fact, such fiber-optic temperature sensors make it possible, depending on the methodology employed, to carry out temperature measurements regularly along an optical fiber over distances greater than ten or so kilometers.

For all fiber-optic temperature measurement methods, the temperature measurement is relative. It may thus be necessary to provide for, during the installation, and throughout the use of a fiber-optic temperature sensor, carrying out a temperature calibration of such a sensor. In fact, such a calibration makes it possible to verify the correct operation and/or to estimate the temperature drift of the sensor.

Here, and in the remainder of the description, absolute temperature measurement and relative temperature measurement are taken to mean, respectively, a thermodynamic temperature measurement not involving a temperature differential and being expressed in any temperature unit, and a measurement of a temperature differential being able to be a differential vis-à-vis a reference temperature or a variation in temperature over time.

More precisely, the invention relates to a device for calibrating the temperature of a fiber-optic temperature sensor, a method of temperature calibration and a method of distance calibration of a fiber-optic temperature sensor.

STATE OF THE PRIOR ART

Different types of fiber-optic temperature sensors exist, the type of temperature sensor being generally determined by the characteristics of the sought after heat measurements, such as the spatial and thermometric resolution, the distances over which the temperature monitoring must be made, or instead the possibilities of monitoring other parameters, such as deformations of the monitored structure.

Thus, the temperature measurement may be carried out by putting in place fiber-optic sensors referred to as "spot" sensors of Bragg grating type, whether they are photo-inscribed (better known by the acronym FBG for Fiber Bragg Grating) or geometric (better known by the acronym LPG for Long Period fiber Grating), these being placed judiciously at the places at which a temperature measurement is necessary, or by exploiting one of the non-linear phenomena of backscattering of light that may take place along the fiber, namely Rayleigh, Brillouin and Raman backscattering phenomena.

Whatever the type of fiber-optic sensor used, since the optical fiber of the sensor is intended to equip a large structure over periods well beyond ten or so years, fiber-optic sensors are liable to exhibit problems of drifts over time of the temperature measurement. Such drifts cannot be ignored and thus require regular calibration of the fiber-optic sensor. Similarly, the measurements with such a sensor are dependent on the devices used, such as the laser and the photodetector, of which the replacement, following a breakdown for example, may bring about a systematic error in the temperature measurement.

With the aim of responding to these different problems, different methodologies of calibrating the temperature of a fiber-optic sensor have been put in place.

A first methodology, disclosed in the U.S. Pat. No. 7,529, 434 and the international patent application WO 2010/036360, consists in combining several types of measurements on a same optical fiber to calibrate the fiber-optic temperature sensor. Thus, it is possible, as disclosed in the document U.S. Pat. No. 7,529,434, to combine a temperature measurement using the phenomenon of Raman backscattering with that of Brillouin backscattering. It is also possible to combine measurements using a same phenomenon of backscattering, Raman backscattering in the document WO 2010/036360, from two light sources of different wavelengths. This methodology makes it possible, by virtue of the use of the optical fiber in itself for the calibration, to carry out the temperature calibration at any location of the optical fiber.

Nevertheless, if the combination of two temperature measurement methods along the optical fiber of a fiber-optic temperature sensor makes it possible to reduce the problems of drift inherent in these techniques, it is necessary to correlate these measurement both spatially and for temperature. This double correlation causes an uncertainty regarding the temperature measurement. In addition, these techniques remain subject to the fact that these measurements are relative temperature measurements that do not make it possible to obtain an absolute temperature measurement.

A second methodology consists, as disclosed in the patent GB 2407637, in regularly installing along the fiber secondary temperature sensors capable of performing an absolute temperature measurement, the calibration of the optical fiber being carried out at the temperature measured by the secondary measurement sensor.

Although such temperature sensors make it possible to supply a reference for the temperature calibration of the optical fiber, they can also exhibit a thermal drift and thus have a limited reproducibility as regards the temperature calibration. In addition, such secondary sensors do not make it possible to calibrate the optical fiber at different temperatures, this calibration being necessarily carried out at the temperature of the optical fiber at the moment of the calibration.

A third methodology, derived from the second, consists, as disclosed in the patent application CN 101387562, in combining in the form of a calibration device a secondary sensor with a system of transferring heat energy, such as a heating system and/or a cooling system. Such a calibration device comprises a device body comprising a passage through which the optical fiber is to pass, the system for transferring heat energy to the optical fiber combined with a means of regulating the temperature of said system for transferring heat energy and the secondary sensor. The transfer system is thermally connected to the optical fiber and the secondary sensor is arranged in the body so as to measure the temperature at the level of the optical fiber near to the heat exchange system.

Thus, the optical fiber having a part housed in the passage of the device body, during the calibration of the sensor, the heat exchange system is implemented so as to regulate to a predefined temperature. The part of the optical fiber is heated to the predefined temperature and the measurement of the temperature by means of the fiber-optic sensor makes it possible to obtain the calibration.

Nevertheless, although such a method enables a calibration at any temperature, it poses a problem vis-à-vis its stability over time. In fact, the means of transferring heat energy and the secondary sensor may show a drift over time and thus bring about an error of calibration of the fiber-optic sensor.

DESCRIPTION OF THE INVENTION

The present invention aims to overcome this drawback.

One of the aims of the invention is thus to provide a device for calibrating the temperature of a fiber-optic temperature sensor that enables a temperature calibration of a fiber-optic temperature sensor on site and which enables an absolute temperature calibration in a durable and reproducible manner over periods that can exceed ten or so years.

To this end, the invention relates to a device for calibrating the temperature of a fiber-optic temperature sensor intended to equip an optical fiber of a fiber-optic temperature sensor, said device comprising:

a device body having a passage through which the optical fiber is to pass, and a means for transferring heat energy, the device comprising at least one portion, referred to as a first fixed point, made from a first material having at least one first predefined temperature at which the state thereof changes, said first fixed point is thermally connected to the optical fiber when the device equips the optical fiber, the heat-transferring means is arranged in the device body such that, during the actuation thereof, the heat-transferring means exchanges heat energy with the first fixed point so as to cause a change in the state thereof at the first predefined temperature.

Here, and in the remainder of this document, a change of state of the fixed point is taken to mean a change of state of the material composing said fixed point.

Here, and in the remainder of this document, change of state of a material is also taken to mean the passage of said material from one state to another, such as melting, corresponding to the passage from the solid state to the liquid state, solidification, corresponding to the passage from the liquid state to the solid state or instead sublimation, corresponding to the passage from the solid state to the gaseous state.

Such a device, by virtue of its passage, may equip an optical fiber, whether in production during a calibration of the optical fiber before its installation on site, or on site, when the optical fiber equips a structure or equipment to be monitored. This device also enables a calibration at the predefined temperature with good resolution, since said temperature is that corresponding to the change of state of the first fixed point, and in a durable manner, since the predefined temperature only depends on the composition of the material constituting the fixed point. Thus, it is possible with such a device to temperature calibrate a fiber-optic sensor at a controlled temperature without risk of drift over time even over periods longer than ten or so years.

The first material may be constituted of a single element or a compound of several elements, such as an alloy of metals.

The means for transferring heat energy may be supplied by a heating system, such as a resistance heating element, and/or a cooling system, such as a Peltier module.

Provision may further be provided for a portion made from heat conducting material, said portion being arranged in the device body so as to provide a thermal connection between the first fixed point and the optical fiber when equips the optical fiber is provided with the device.

Such a conducting material enables a thermal bridge to be made between the optical fiber, when the device equips the optical fiber of a fiber-optic sensor, in this way it is possible to connect a part of the optical fiber of larger dimension than if the fixed point was in direct contact with the optical fiber.

The heat conducting material may be a material of which at least one of the constituents is selected from the group comprising copper, alloys of copper, such as copper tellurium, aluminum and alloys of aluminum.

Such a conducting material has a high thermal conductivity making it possible to optimize heat exchanges between the means for transferring heat energy and the optical fiber.

The portion made of conducting material may be of lengthened shape, the passage being a longitudinal passage cut in said portion made of conducting material.

In this way, when the optical fiber is equipped with the device, the fiber being arranged in the passage, the heat exchanges through the portion made of conducting material can take place on the totality of the surface of the part of the optical fiber arranged in said passage.

According to a variant of the invention, the passage may have a system of lateral introduction adapted to allow the lateral introduction of an optical fiber into the passage, the system of introduction being moreover adapted to maintain in place the optical fiber after its introduction into the passage.

Such a system of introduction enables an installation of the device on an optical fiber already in place, the installation being able to take place by lateral introduction.

Provision may further be made for a temperature measuring means arranged to measure the temperature of the portion made from conducting material and/or of the first fixed point, said measuring means being preferentially adapted to carry out an absolute temperature measurement.

Such a temperature measuring means makes it possible to verify the correct operation of the calibration device, the device generally being intended to be integrated, with the optical fiber, in the structure to be monitored with a reduced accessibility.

The first fixed point is thermally connected to the optical fiber on a part of the optical fiber, said thermal connection may be adapted such that the length of the part of the optical fiber in thermal connection with the first fixed point is greater than or equal to the spatial resolution of the fiber-optic temperature sensor.

Such a thermal connection of the first fixed point with the optical fiber makes it possible to assure that the temperature measurement made by the fiber-optic temperature sensor at the level of the device, this during the implementation of the device for the calibration of the temperature sensor, is the most accurate possible by reducing the influence of the environment of the optical fiber near to the location of the device on the optical fiber.

The means for transferring heat energy may comprise a means of regulating the heat energy adapted to regulate the heat energy exchanged between the means for transferring heat energy and the first fixed point.

Such a means of regulation of the heat energy enables a well-controlled exchange of temperature, thereby limiting the energy consumed by the device during its implementation and maximizing the time of change of state of the first fixed point, thereby optimizing the stabilization of the temperature of the optical fiber during its calibration.

Heat confinement means may be provided, said confinement means being arranged so as to limit heat losses during the exchange of heat energy between the means for transferring heat energy and the first fixed point.

Such confinement means reduce losses of heat energy during the implementation of the device thereby limiting the energy consumption of the device while stabilizing its temperature.

Provision may also be made for at least one portion, referred to as second fixed point, which is made from a second material having at least one second predefined temperature at which the state thereof changes different from the first predefined temperature, said second fixed point is thermally connected to the optical fiber when the device equips the optical fiber and the heat-transferring means is arranged in the device body such that, during the actuation thereof, the heat-transferring means exchanges heat energy with the second fixed point to cause a change of state at the second predefined temperature.

Such a second portion enables the calibration of the optical fiber at least two predefined temperatures thereby making it possible to have a temperature measurement of the sensor that is the most accurate possible whatever the measured temperature.

The body may be hermetically sealed when the device equips an optical fiber, said hermetic sealing being preferentially obtained by means of seals arranged at the inlets of the passage.

According to a particular application in which the device is adapted for the calibration of an optical fiber intended to work over a temperature range extending from 0 to 100° C., provision may also be made for at least one portion, referred to as third fixed point, which is made from a third material having at least one third predefined temperature at which the state thereof changes different to the first and the second predefined temperature, said third fixed point is thermally connected to the optical fiber when the device equips the optical fiber and the heat-transferring means is arranged in the device body such that, during the actuation thereof, the heat-transferring means exchanges heat energy with the third fixed point so as to cause a change of state thereof at the third predefined temperature, the first material being composed of 99.78% of gallium by weight and 0.22% of bismuth by weight, the second material being composed of 49% of bismuth by weight, 21% of indium by weight, 18% of lead by weight and 12% of tin by weight, the third material being composed of 66.7% of indium by weight and 33.3% of bismuth by weight.

The invention also relates to a method of calibrating the temperature of a fiber-optic temperature sensor, said method implementing a device according to the invention and comprising the steps consisting in:
supplying a device according to the invention,
equipping an optical fiber of the fiber-optic sensor of the device, the equipment of the optical fiber being realized such that the optical fiber is arranged in the passage of the device,
implementing the energy transfer means of the device so as to cause a change of state of the first fixed point at the first predefined temperature,
implementing the fiber-optic sensor and detecting a change of temperature at a location along the optical fiber,
waiting for a stabilization of the temperature measured at the location of the optical fiber and calibrating the temperature measured at this location with respect to the first predefined temperature.

Such a method makes it possible to temperature calibrate in an absolute manner a fiber-optic sensor, the calibration temperature being supplied by the change of state temperature of the first fixed point.

Provision may further be made for the steps consisting in:
stopping, or modifying, the implementation of the energy transfer means so as to stop, or reverse, the exchange of heat energy with the first fixed point, this stoppage, or inversion, being carried out such that the first fixed point reaches a temperature corresponding to a reverse change of state, referred to as reversed state temperature,
waiting for the dissipation of a part of the energy exchanged between the first fixed point and the energy transfer means, such that the change of state of the first fixed point begins to reverse,
waiting for a stabilization of the temperature measured at the location,
correcting the calibration of the temperature measured at the location from the temperature of reverse change of state of the first fixed point.

Such steps enable an improved calibration of the fiber-optic sensor, the calibration of the fiber-optic sensor being carried out both during the change of state of the material constituting the first fixed point and during the reverse change of state of said same material.

The invention also relates to a method of distance calibration of a fiber-optic sensor, such a method implementing a device according to the invention and comprising the steps consisting in:
supplying a device according to the invention,
equipping an optical fiber of the fiber-optic sensor of the device, the equipment of the optical fiber being realized such that the optical fiber is arranged along the passage of the device, said equipment being formed at a location along the optical fiber,
providing a means of measuring the distance of the location of the device with respect to a reference position of the optical fiber, said reference position being able to be in particular supplied by the position of another device according to the invention or the position of an end of the optical fiber, implementing the energy transfer means of the device so as to cause a change of state of the first fixed point at the first predefined temperature, implementing the fiber-optic sensor and detecting the position of the change of temperature at a location along the optical fiber, distance calibrating the fiber-optic sensor so as to make the position measured by the sensor correspond with the position measured from the means of measuring the distance.

Such a method enables a distance calibration of the fiber-optic sensor.

BRIEF DESCRIPTION OF THE DRAWINGS

The present invention will be better understood on reading the description of embodiment examples, given purely by way of indication and in no way limiting, while referring to the appended figures, among which.

Identical, similar or equivalent parts of the different figures bear the same numerical references so as to make it easier to go from one figure to the next.

The different possibilities (variants and embodiments) should be understood as not being mutually exclusive and may be combined together.

DETAILED DESCRIPTION OF PARTICULAR EMBODIMENTS

Figure 1:
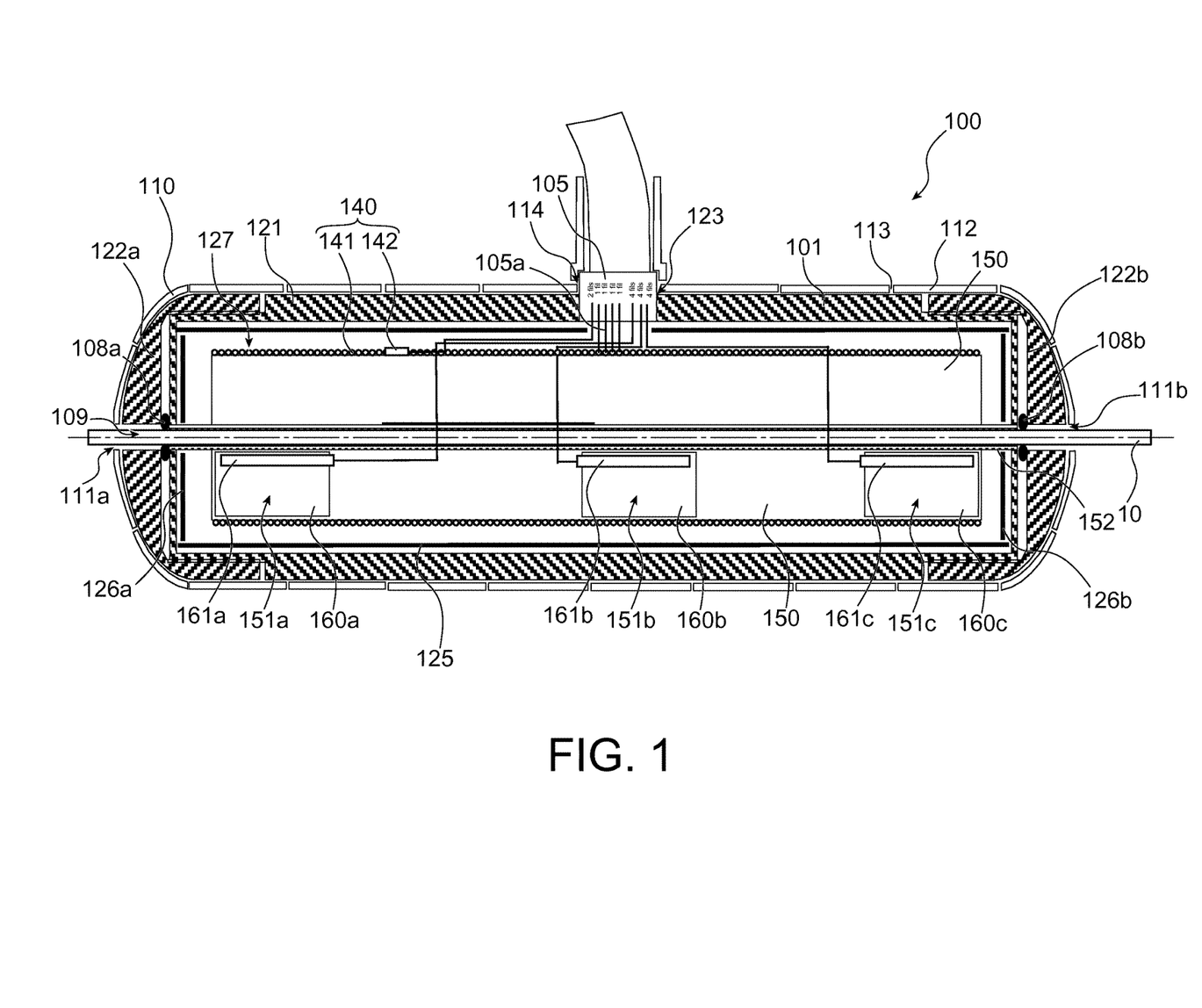
FIG. 1 illustrates a calibration device according to the invention equipping an optical fiber of a fiber-optic temperature sensor.

FIG. 1 illustrates a device 100 for calibrating the temperature of a fiber-optic sensor equipping the optical fiber 10 of a fiber-optic sensor, not illustrated other than by its optical fiber 10.

The device 100 may equip any type of fiber-optic sensor whatever the methodology employed for the temperature measurement. The fiber-optic sensor may thus be not only a fiber-optic sensor using Bragg gratings (FBG and LPG) but also fiber-optic sensors using backscattering phenomena such as Raman, Brillouin and Rayleigh backscattering.

For a fiber-optic sensor using Bragg gratings, not illustrated, the device is placed at the level of one of the Bragg gratings arranged in the optical fiber 10.

Such a device 100 comes in the form of a device body 101 comprising:

a cavity 127, a block made of heat conducting material 150 delimiting three chambers 151$a,b,c$, said block 150 comprising a tube 152 delimiting a passage 109 for the optical fiber 10 of the fiber-optic sensor, a first, a second and a third block 160$a,b,c$ said fixed points each arranged in one of the chambers 151$a,b,c$ of the block of conducting material 150, each of the fixed points 160$a,b,c$ being made from a material having a predefined temperature at which the state thereof changes different to those of the two other fixed points 160$a,b,c$, a double system of resistance heating elements 140 arranged around the block made from conducting material 150, a connection system 105 adapted to connect the device to an external control system, not illustrated.

The block of conducting material 150 and the three fixed points 160,$a,b,c$ each form a portion of the device body 101.

The device body 101 also comprises an external casing 110 having a general cylinder of revolution shape with the two cambered bases of the cylinder. Thus, the device body 101 has an axial symmetry along an axis of revolution. Such a shape enables the device body 101 not to have a salient angle, thereby limiting the stresses that may be applied by the device 100 on the environment of the optical fiber 10 during an implementation of the device 100 during which the device 100 has an expansion of its device body 101.

The casing 110 has on each of these bases an inlet 111$a,b$ for the optical fiber 10, said inlets 111$a,b$ being cut at the level of the intersection between each of the bases and the axis of revolution 106.

To allow thermal expansion of the device body 101 without damaging the casing 110, the casing 110 may be, as illustrated in FIG. 1, constituted of several portions of casing 112, such as cylindrical portions, joined together by expansion joints 113. According to this possibility, the portions of casing 112 are made from a metal material, such as stainless steel.

The expansion joints 113 may be strips made from elastically deformable material, such as elastomers, silicone, rubber, whether natural or synthetic, or metal.

According to another possibility, for which the expansion remains contained, the casing 110 may be a simple metal casing without the presence of expansion joints. In an identical manner to the preceding possibility, the metal material, according to this possibility, may be for example stainless steel.

The casing 110 comprises a first connection orifice 114 on its lateral wall for the placement of the connection system 105.

The body also comprises reinforcements 121, 122$a,b$ of the casing making it possible to stiffen the device body 101 so that it can withstand the pressure that can exist in the environment of the optical fiber 10. To obtain good stiffening, the reinforcements 121, 122$a,b$ are in contact with the casing 110 housed by the latter.

The reinforcements 121, 122$a,b$ may be, as illustrated in FIG. 1, three in number, a central reinforcement 121 delimiting the cavity 127, and two lateral reinforcements 122$a,b$.

The central reinforcement 121 has a generally cylindrical shape and has a hollowing-out, also cylindrical, forming the cavity 127. At each of the ends of the cylinder, at the level of its corresponding base, the lateral wall of the cylinder has a threading for the mounting of a lateral reinforcement 122$a,b$.

The central reinforcement 121 comprises a second connection orifice 123 corresponding to the same first connection orifice 114 of the casing 110. Thus, the connection system 105 is integrated in the body housed in a hollow formed by the first and second connection orifice 114, 123 in communication with the cavity 127.

The connection system 105 is arranged in the device body 100 such that the hollow formed by the first and the second connection orifice 114, 123 is closed and rendered leak tight.

Each of the bases of the central reinforcement 121 has an inlet for the optical fiber 10 at the level of the intersection between the corresponding base and the axis of revolution 106.

Each of the lateral reinforcements 122a,b has a hollow flattened cylinder shape, a base of which is cambered in an identical manner to the base of the casing 110 with which is associated said lateral reinforcement 122a,b, and the other base of which is open. The inner wall of each of the lateral reinforcements 122a,b has a threading complementary to that of the central reinforcement 121. Thus, each of the lateral reinforcements 122a,b is screwed onto the central reinforcement 121.

The device body 101 also comprises two seals 108a,b to render leak tight the device body 101 when the optical fiber 10 is equipped with the device 100, each seal 108a,b corresponding to an inlet of the central reinforcement 121 and to the inlet of the lateral reinforcement 122a,b which is screwed on at the level of the base corresponding to said inlet of the central reinforcement 121. Each of the seals 108a,b is compressed in the device body 101 between the base of the central reinforcement 121 comprising the inlet corresponding to said seal 108a,b and the corresponding lateral reinforcement 122a,b. In this way, the cavity 127 is rendered leak tight, as illustrated in FIG. 1, when the device 100 equips the optical fiber 10.

So as to limit heat losses during the implementation of the double system of resistance heating elements 140, the cavity 127 may comprise, as illustrated in FIG. 1, reflecting screens 125, 126a,b. Such reflecting screens 125, 126a,b make it possible to reflect and to send back in the direction of the cavity 127 the part of the heat energy radiated by the double system of resistance heating elements 140 which is not in the direction of the block of conducting material 150.

The reflecting screens 125, 126a,b may be three in number, a central screen 125 lining the lateral face of the inner wall of the cavity 127 and two lateral screens 126a,b each lining the surface of one of the two bases of the cavity 127. The two lateral screens 126a,b each having an orifice for the passage of the tube 152, said orifice being positioned at the level of the intersection of said lateral screen 126a,b with the axis of revolution 106.

The central screen 125 comprises a third connection orifice for the connectors 105a between the connection system 114 and the double system of resistance heating elements 140.

The set of reflecting screens 125, 126a,b form heat confinement means arranged so as to limit heat losses during an exchange of heat energy between the double system of resistance heating elements 140 and the block of conducting material 150.

The double system of resistance heating elements 140 is a set constituted of two resistance heating elements 141 and a mechanism for regulating 142 the power of said resistance heating elements 141. The regulating mechanism 142 forms a means of regulating the heat energy exchanged between the resistance heating elements 141 and the three fixed points 160a,b,c.

The double system of resistance heating elements 140 is arranged around the block made from conductive material 150 such that when the double system of resistance heating elements 140 is implemented, the double system of resistance heating elements 140 exchanges heat energy with each of the fixed points 160a,b,c through the block made from conducting material 150.

In this way, the double system of resistance heating elements 140 forms a means for transferring heat energy.

The block made of conducting material 150 has a general substantially cylinder of revolution shape with the cut-out of the passage 109 for the optical fiber 10, in the form of the tube 152, along its axis of revolution 106.

The tube 152 has a substantially tubular shape. The tube 152 has an internal diameter substantially equal to the external diameter of the optical fiber 10, so as to optimize heat exchanges between the tube 152 and the optical fiber 10.

The tube 152 extends the remainder of the block of conducting material 150 on either side up to the orifice for the passage of the central reinforcement 121.

The tube 152 is in thermal contact with the optical fiber 10. The length of the tube 152 covers a part of the optical fiber 10 to thermally connect the part of the optical fiber 10 with the fixed points 160a,b,c. In order to provide a good quality calibration, the length of the tube 152 is preferentially defined such that the length of the part of optical fiber 10 covered by the tube 152 is greater than the spatial resolution of the fiber-optic sensor. Thus, according to this principle, for a fiber-optic sensor using the phenomenon of Rayleigh backscattering, the length of the tube must be chosen above 3 mm whereas for a sensor implementing the phenomenon of Raman backscattering, this same length must be chosen above 1 m.

The tube 152 is preferentially made from the same material as the remainder of the block of conducting material 150, but may also be made from a different material without going beyond the scope of the invention.

Similarly, although in FIG. 1, the tube 152 and the remainder of the block made of conducting material 150 are two separate elements, the block made of conducting material 150 may be one piece without going beyond the scope of the invention.

The three chambers 151a,b,c are spread out along the conducting block 150 near to the tube 152, each of the chambers 151a,b,c containing one of the first, second and third fixed points 160a,b,c.

The materials constituting each of the fixed points 160a,b,c are chosen as a function of the operating temperatures of the fiber-optic sensor. Thus, the following table illustrates the existing standard materials that can be used as fixed points and their corresponding change of state temperatures.

TABLE 1

Standard materials and corresponding change of state temperatures

| Material | Change of state temperature in degrees Celsius |
|---|---|
| Argon | −189.3442 |
| Mercury | −38.8344 |
| Water | +0.01 |
| Gallium | +29.7646 |
| Indium | +156.5985 |
| Tin | +231.928 |
| Zinc | +419.527 |
| Aluminum | +660.323 |
| Silver | +961.78 |

According to a particular application in which the device is adapted to equip a fiber-optic sensor intended to work over a temperature range extending from 0 to 100° C., it is necessary to use materials for which the change of state temperature is comprised in this range. In table 1, only gallium meets this criterion.

Such a device 100 according to this particular application thus necessarily comprises, when it is equipped with several fixed points 160a,b,c, certain of these fixed points 160a,b,c made from alloys of several elements. For example, such a device 100, comprising three fixed points 160*a,b,c*, may comprise the following fixed points:

the first fixed point 160*a* comprising a material composed of 99.78% gallium by weight and 0.22% bismuth by weight, the first predefined change of state temperature Tpd1 of which is 29.7° C., the second fixed point 160*b* comprising a material composed of 49% of bismuth by weight, 21% of indium by weight, 18% of lead by weight and 12% of tin by weight, the second predefined change of state temperature Tpd2 of which is 58° C., the third fixed point 160*c* comprising a material composed 66.7% of indium by weight and 33.3% of bismuth by weight, the third predefined change of state temperature of which is 72.7° C.

Obviously, a device 100 adapted for the calibration of an optical fiber 10 intended to work over a different temperature range comprises fixed points that are adapted for said temperature range not limited to those given in table 1 and cited above.

Each of the chambers 151*a,b,c* further contains a temperature probe 161*a,b,c* adapted to measure the temperature of the corresponding fixed point 160*a,b,c*. Each temperature probe 161*a,b,c* is preferentially a temperature probe performing an absolute measurement of the temperature.

Each temperature probe 161*a,b,c* may be for example a platinum probe, a thermocouple, a vibrating cord type temperature sensor or any other measurement system known to those skilled in the art and being able to be adapted to measure the temperature of a fixed point 160*a,b,c* and/or of the block of conducting material 150.

Each temperature probe 161*a,b,c* forms a temperature measuring means arranged to measure the temperature of a fixed point 160*a,b,c*.

Each temperature probe 161*a,b,c*, each resistance heating element 141 and the regulation mechanism 142 are connected to the connection system by means of connectors 105*a*.

Such a device 100 may thus equip an optical fiber 10 to enable the calibration of the fiber-optic sensor.

The installation of the device 100 on the optical fiber 10, with a device 100 according to this embodiment, is preferentially carried out during the installation of the optical fiber 10. In fact, to install the device 100, the optical fiber 10 must be passed in the passage 109, which requires an access to at least the length of optical fiber 10 going from one of the ends of the optical fiber 10 to the location on the optical fiber 10 of the device 100.

Nevertheless, it is also possible to install the device 100 on an optical fiber 10 already in place. Such an installation may be achieved with an access uniquely to the zone of the optical fiber 10 that must be equipped.

Such a device may be implemented during the calibration of a fiber-optic sensor from a method comprising, for just the use of the first fixed point 160*a* corresponding to the lowest predefined temperature, the steps consisting in:

implementing the double system of resistance heating elements 140, the regulation mechanism 142 being commanded so as to apply a sufficient temperature so as to cause a change of state of the first fixed point 160*a* at the first predefined temperature, implementing the fiber-optic sensor and detecting a change of temperature at a location along the optical fiber 10, said location having to correspond to that of the device 100, waiting for a stabilization of the temperature measured at the location of the optical fiber 10 and recording the temperature measured at said location, waiting for the temperature measured at the location of the optical fiber 10 to begin to rise again, thereby indicating that the change of state of the first fixed point 160*a* is totally realized, reducing the power applied by the double system of resistance heating elements 140, by means of the regulation mechanism 142, waiting for a reduction of the temperature measured at the location of the optical fiber 10, and waiting for the stabilization that follows therefrom, said stabilization corresponding to the reverse change of state of the first fixed point 160*a*, and recording the corresponding temperature, using the temperatures measured during the change of state and the reverse change of state to calibrate the temperature measurements obtained from the fiber-optic sensor.

During the implementation of this method, so as to apply to the optical fiber 10 the predefined temperature over a considerable time period, thereby limiting the risks that the thermal stabilization of the optical fiber 10 is not reached, the regulation mechanism 142 may be adapted to apply a temperature slightly above that of the first predefined temperature.

Similarly, during the reduction of the applied power, the regulation mechanism 142 may be adapted to apply a temperature slightly below that of the reverse change of state temperature of the first fixed point 160*a*.

A temperature slightly above or below a reference temperature is taken to mean a temperature of which the gradient with the reference temperature is of the order of 0.1° C., preferentially below 0.1° C.

A method with a single fixed point 160*a* makes it possible to correct a single temperature shift. A better calibration may be obtained by carrying out a calibration according to a similar method using several fixed points.

Figure 2:
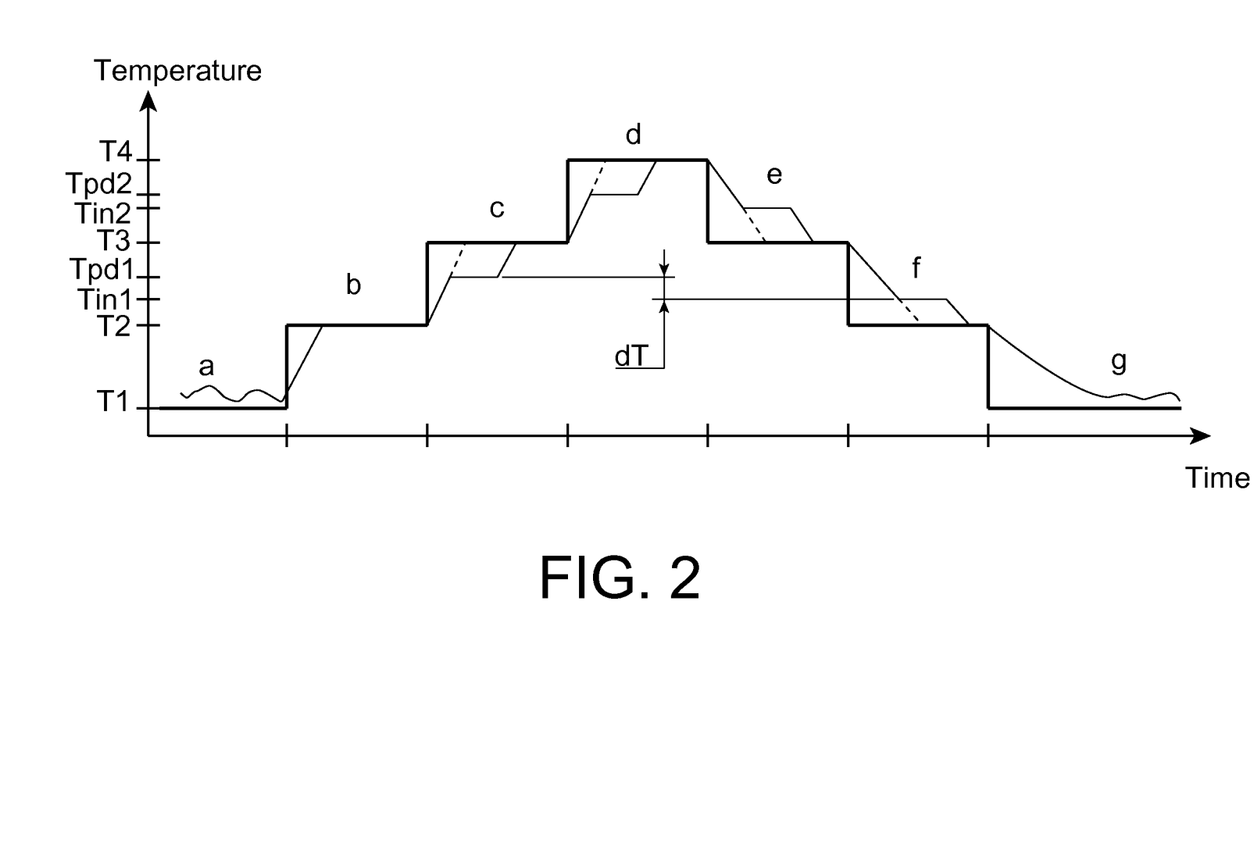
FIG. 2 illustrates an example of variation of the temperature applied by a heating system of the device and that measured at the level of one of the fixed points.

Thus, for a device 100 comprising three fixed points 160*a,b,c*, the device 100 may be implemented by applying successively by the regulation of the regulation mechanism 142, and as illustrated in FIG. 2, temperatures slightly above the first predefined temperature Tpd1, then at the second predefined temperature Tpd2 and finally the third predefined temperature.

In this way, the stabilization temperature at the location of the optical fiber passes successively to the change of state temperature of the first fixed point 160*a*, to the change of state temperature of the second fixed point 160*b* and to the change of state temperature of the third fixed point 160*c*.

In the same way as for the method uniquely implementing the first fixed point 160*a*, it is possible to command the regulation mechanism 142 such that the double system of resistance heating elements 140 applies, during the cooling of the device 101 successively a temperature slightly below that of the reverse change of state of the third fixed point 160*c*, the second fixed point 160*b*, and the first fixed point 160*a*.

In this way, the stabilization temperature at the location of the optical fiber 10 passes successively to the third reverse change of state temperature of the third fixed point 160*c*, the second reverse change of state temperature Tin2 of the second fixed point 160*b* and the first reverse change of state temperature of the first fixed point 160*a*.

These different temperatures being measured by the implementation of the fiber-optic sensor, it is possible to calibrate the fiber-optic sensor by comparing the temperatures measured with the change of state temperatures of the different fixed points 160a,b,c.

FIG. 2, illustrates an example of measurements of temperatures T over time t obtained during the implementation of a method of calibration with the activation of two fixed points 160a,b, the dashed line corresponding to the set temperature of the regulation mechanism 142 and the solid line to the temperatures measured by the fiber-optic sensor at the location of the device 100.

It may thus be seen in FIG. 2 that in a first step referenced a) in which the double system of resistance heating elements 140 is not activated, the fiber-optic sensor measures the variations of temperature at the location of the device 100.

At step b), the device 101 is implemented with the regulation mechanism programmed such that the double system of resistance heating elements 140 applies to the block of conducting material 150 a temperature T2 below the first predefined temperature Tpd1. The block of conducting material 140 then takes the temperature of T2, which is confirmed by the temperature measured by the fiber-optic temperature sensor.

At step c), the regulation mechanism 142 is programmed such that the double system of resistance heating elements 140 applies to the block of conducting material 150 a temperature T3 above the first predefined temperature Tpd1 and below the second predefined temperature Tpd2. Thus, the double system of resistance heating elements 140 transmits to the first fixed point 160a sufficient heat energy to cause the change of state thereof at the first predefined temperature Tpd1. During the change of state, the energy dissipated by the change of state of the first fixed point 160a maintains the block made from conducting material 150 at the first predefined temperature Tpd1 as illustrated in FIG. 2. This first temperature, corresponding to a stabilization of the temperature throughout the whole change of state phenomenon, is measured by the fiber-optic sensor. Once the change of state of the first fixed point 160a is completed, the block made of conducting material 150 takes the temperature T3.

At step d), the regulation mechanism is programmed such that the double system of resistance heating elements 140 applies to the block of conducting material 150 a temperature T4 above the second predefined temperature Tpd2. As a result, in a similar manner to step c) concerning the first fixed point 160a, a change of state of the second fixed point 160b, corresponding to a stabilization of the temperature measured by the fiber-optic sensor is detected and the corresponding temperature is then measured by the fiber-optic sensor.

Once the change of state of the second fixed point 160b is completed, the regulation mechanism is programmed, during step e) such that the double system of resistance heating elements 140 reapplies to the block of conducting material 150 the temperature T3, this temperature also being below the second reverse change of state temperature Tin2 of the second fixed point 160b. The lowering of the temperature of the block of conducting material 150 that ensues causes a reverse change of state of the second fixed point 160b which recovers its initial state. During the reverse change of state, the energy supplied by the change of state of the second fixed point 160b maintains the block made from conducting material 150 at the second reverse change of state temperature Tin2 of the second fixed point 160b, this second temperature Tin2 being, as illustrated in FIG. 2, below that of the second predefined temperature Tpd2.

This same procedure is also employed at step f), with the programming of the regulation mechanism at the temperature T2. During this step, the first fixed point 160a recovers its initial state in going through a reverse change of state. During this reverse change of state of the first fixed point 160a, the conducting block 150, and thus the optical fiber, take the first reverse change of state temperature Tin1 of the first fixed point 160a.

Once the reverse change of state of the first fixed point 160a is completed, the implementation of the double system of resistance heating elements 140 is stopped. The temperatures measured by the fiber-optic sensor at each of the changes of state and reverse changes of state may be employed to calibrate the fiber-optic sensor. In fact, the change of state Tpd1, Tpd2 and reverse change of state temperatures Tin1, Tin2 are defined during the manufacture of the device by the choice of the materials constituting each of the fixed points 160a,b,c, and are thus known and invariable characteristics of the device 100.

The device 100 may also be implemented through a method of distance calibration of the fiber-optic sensor. Such an implementation is generally carried out to calibrate the distance between two devices 100, 100' (see FIG. 3) along the optical fiber and necessitates providing means of measuring the distance between the two devices 100, 100' that is accessible at the surface of the structure without modification of the location of the optical fiber. Such means of measuring 300, 300' the distance may be, for example, for each of the devices 100, 100', a pillar integral 301,301' with the casing 110 of the corresponding device 100, 100'. Each pillar 301, 301', protruding from the surface of the structure when the corresponding device equips the optical fiber 10 of the fiber-optic sensor monitoring said structure. According to this example, each pillar 301, 301' may comprise at its protruding end a reflective prism 302, 302' compatible with a tachometer.

Figure 3:
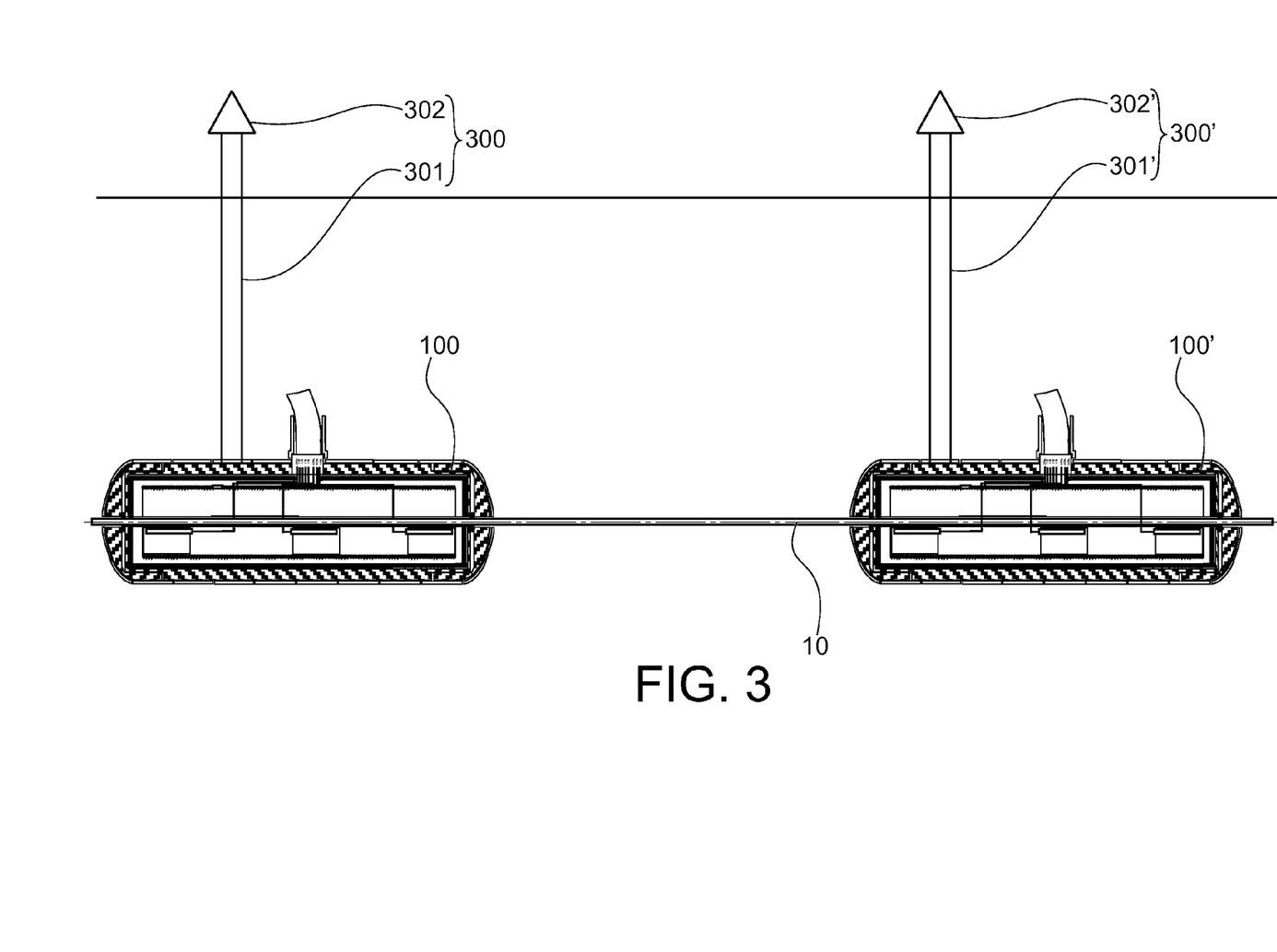
FIG. 3 illustrates an example of installation comprising several devices according to the invention implemented during a distance calibration of a fiber-optic heat sensor, FIG. 4 schematically illustrates a possibility of the invention according to which the device has a system of lateral introduction.

Thus, it is possible to monitor at the surface the movement of each device 100, 100' with respect to each other and/or with respect to one of the ends of the optical fiber, if these also comprise a means of measuring the distance 300, 300'.

Such a method comprises, when it is used to calibrate the distance between two devices 100, 100' installed along the optical fiber 10, as illustrated in FIG. 3, the steps consisting in:
  simultaneously implementing the regulation mechanism 142 of the first and of the second device 100, 100' so as to cause a change of state for each of one of their fixed points 160a,b,c,
  implementing the fiber-optic temperature sensor and detecting the position of the changes of temperature at the locations along the optical fiber 10 corresponding to the first and to the second device 100, 100',
  distance calibrating the fiber-optic sensor so as to make the distance between the two devices 100, 100' measured by the fiber-optic sensor correspond with the distance measured from the means of measuring the distance 300, 300'.

In order to properly differentiate the first device 100 from the second device 100' it is possible to implement the regulation mechanism of each of the devices 100, 100' at a temperature corresponding to a fixed point 160a,b,c different from that implemented by the other device 100, 100'.

It is also possible to carry out the temperature calibration method and that of distance calibration simultaneously to each other. According to this possibility, the two devices 100, 100' are implemented simultaneously for a temperature calibration, thus the detection of the two locations of the temperature variation enables the distance calibration and the temperature values corresponding to each of the changes of state of the fixed points 160,a,b,c enabling the temperature calibration.

According to the embodiment described above, the device 100 must be installed on the optical fiber 10 in passing the optical fiber in the passage 109. This thus requires an access to the fiber of one of these ends to the location on which the device 100 must be installed and thus more particularly adapted to equip the optical fiber during its installation on a structure.

It is also possible to equip the optical fiber 10 of the device 100 without having access to one of its two ends by cutting the optical fiber 10 near to the location provided on the optical fiber 10, thereby defining two portions of optical fiber 10, one of which comprises the location. The portion of optical fiber 10 comprising the location may then be introduced into the passage 109. Once the device 100 is in place, the two portions are fused together so that the optical fiber 10 recovers its integrity.

Figure 4:
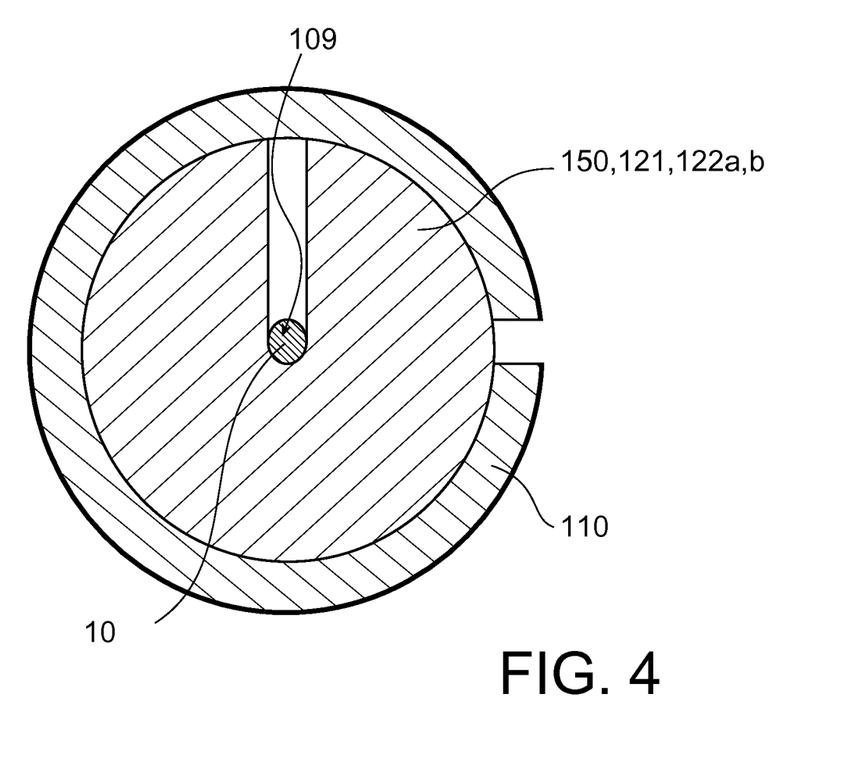

According to a variant of the invention schematized in FIG. 4, the passage 109 may be adapted to enable a removable installation of the device.

According to this variant, the passage 109 cut in the block of conducting material 150 is cut along the axis of revolution 106, also referred to as longitudinal axis, over its whole length a first longitudinal introduction slot of the optical fiber 10 being provided to place in communication the passage 109 with the casing 110. The casing 110 is movable in rotation around reinforcements 121,122a,b and along the axis of revolution. The casing 110 itself having a second introduction slot, it is possible to place in communication the first introduction slot with the second introduction slot.

Thus a device 100 according to this variant enables an installation of the optical fiber 10 through the first and the second introduction slot. A rotation of the casing 110 makes it possible, according to this possibility, to close the introduction path while maintaining the optical fiber 10 in the passage 109. The dismantling of the optical fiber 10 may be achieved by a reverse operation.

The first and the second introduction slot with the rotational mounting of the casing 110 on the reinforcements 121, 122a,b form a system of lateral introduction adapted to allow the lateral introduction of the optical fiber 10 into the passage 109.

It should also be noted that in the embodiment described above, if the passage 109 in the device 100 is formed by means of a tube passing through 152 the block of conducting material 150, this can take another shape such as a passage 109 wound around the block of conducting material 150 without going beyond the scope of the invention.

Similarly, according to another possibility of the invention not illustrated, the means for transferring heat energy may be supplied by an energy transfer system other than a thermal resistance system 141 arranged around the conducting block 150, such as a Peltier module, a refrigeration system or a series of thermal resistances integrated in the block of conducting material 150.

Finally, according to one possibility of the invention not illustrated, the device 100 may comprise instead of the temperature probes 161a,b,c arranged in each of the chambers 151a,b,c of the block of conducting material 150, a single temperature probe arranged in the block of conducting material 150 to measure the temperature of the block of conducting material 150, without going beyond the scope of the invention.

The invention claimed is:

1. Device for calibrating the temperature of a fiber-optic temperature sensor with which an optical fiber of a fiber-optic temperature sensor is to be provided, said device comprising:
   a device body having a passage through which the optical fiber is to pass, and
   a heating and/or cooling system,
   wherein the device comprises at least one portion referred to as a first fixed point, which is made from a first material having at least one first predefined temperature at which the state thereof changes, said first fixed point is thermally connected to the optical fiber when the optical fiber is provided with the device, the heating and/or cooling system is arranged in the device body such that, during the actuation thereof, the heating and/or cooling system exchanges heat energy with the first fixed point so as to cause a change in the state thereof at the first predefined temperature; and
   wherein the passage has a system of lateral introduction adapted to allow the lateral introduction of an optical fiber into the passage, the introduction system moreover being adapted to maintain in place the optical fiber after its introduction into the passage.

2. Device according to claim 1, in which is further provided a portion made from heat conducting material, said portion being arranged in the device body so as to provide a thermal connection between the first fixed point and the optical fiber when the optical fiber is provided with the device.

3. Device according to claim 2, in which the portion made from conducting material is of lengthened shape, the passage being a longitudinal passage cut in said portion made from conducting material.

4. Device according to claim 1, in which is moreover provided a temperature sensor arranged to measure the temperature of the portion made from conducting material and/or of the first fixed point, said temperature sensor being preferentially adapted to carry out an absolute temperature measurement.

5. Device according to claim 1, in which the first fixed point is thermally connected to the optical fiber on a part of the optical fiber, said thermal connection being adapted such that the length of the part of the optical fiber in thermal connection with the first fixed point is greater than or equal to the spatial resolution of the fiber-optic temperature sensor.

6. Device according to claim 1, in which the heating and/or cooling system comprises a regulator of the heat energy adapted to regulate the heat energy exchanged between the heating and/or cooling system and the first fixed point.

7. Device according the claim 1, in which heat confinement means are provided, said confinement means being arranged so as to limit heat losses during the exchange of heat energy between the heating and/or cooling system and the first fixed point.

8. Device according to claim 1, in which is also provided at least one portion, referred to as second fixed point, which is made from a second material having at least one second predefined temperature at which the state thereof changes different from the first predefined temperature, said second fixed point is thermally connected to the optical fiber when the optical fiber is provided with the device and the heating and/or cooling system is arranged in the device body such that, during the actuation thereof, the heating and/or cooling system exchanges heat energy with the second fixed point to cause a change of state at the second predefined temperature.

9. Device according to claim 8, in which is also provided at least one portion, referred to as third fixed point, which is made from a third material having at least one third predefined temperature at which the state thereof changes different from the first and the second predefined temperature, said third fixed point is thermally connected to the optical fiber when the optical fiber is provided with the device and the heating and/or cooling system is arranged in the device body such that, during the actuation thereof, the heating and/or cooling system exchanges heat energy with the third fixed point to cause a change of state at the third predefined temperature, the first material being composed of 99.78% of gallium by weight and 0.22% of bismuth by weight, the second material being composed of 49% of bismuth by weight, 21% of indium by weight, 18% of lead by weight and 12% of tin by weight, the third material being composed of 66.7% of indium by weight and 33.3% of bismuth by weight.

10. Method of calibrating the temperature of a fiber-optic temperature sensor implementing a device according to claim 1 and that comprises the steps consisting in:
supplying the device,
equipping an optical fiber of the fiber-optic sensor of the device, the equipment of the optical fiber being realized such that the optical fiber is arranged along the passage,
implementing the heating and/or cooling system of the device so as to cause a change of state of the first fixed point at the first predefined temperature,
implementing the fiber-optic sensor and detecting a change of temperature at a location along the optical fiber,
waiting for a stabilization of the temperature measured at the location of the optical fiber and calibrating the temperature measured at said location with respect to the first predefined temperature.

11. Method according to claim 10, in which is further provided the steps consisting in:
stopping, or modifying, the implementation of the heating and/or cooling so as to stop, or to reverse, the exchange of heat energy with the first fixed point, said stoppage, or inversion, being carried out such that the first fixed point reaches a temperature corresponding to a reverse change of state,
waiting for the dissipation of part of the energy exchanged between the first fixed point (160a) and the heating and/or cooling system, such that the change of state of the first fixed point begins to reverse,
waiting for a stabilization of the temperature measured at the location,
correcting the calibration of the temperature measured at the location from the reverse change of state temperature of the first fixed point.

12. Method of distance calibration of a fiber-optic temperature sensor implementing a device according to claim 1 and in that it comprises the steps consisting in:
supplying the device,
equipping an optical fiber of the fiber-optic sensor of the device, the equipment of the optical fiber being realized such that the optical fiber is arranged along the passage, said equipment being formed at a location along the optical fiber,
providing a means of measuring the distance of the location of the device with respect to a reference position of the optical fiber, said reference position being able to be supplied in particular by the position of another device according to claim 1 or the position of an end of the optical fiber,
implementing the heating and/or cooling system of the device so as to cause a change of state of the first fixed point at the first predefined temperature,
implementing the fiber-optic sensor and detecting the position of the change of temperature at a location along the optical fiber,
distance calibrating the fiber-optic sensor so as to make the position measured by the sensor correspond with the position measured from the means of measuring the distance.

* * * * *